J. B. AND C. B. MORELLI.
ARMORED PNEUMATIC TIRE.
APPLICATION FILED AUG. 28, 1919.
1,400,450.
Patented Dec. 13, 1921.
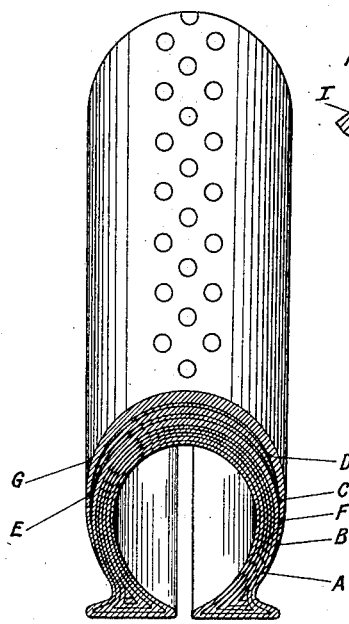
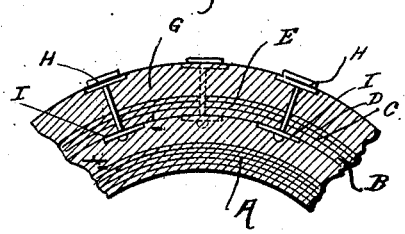
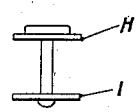
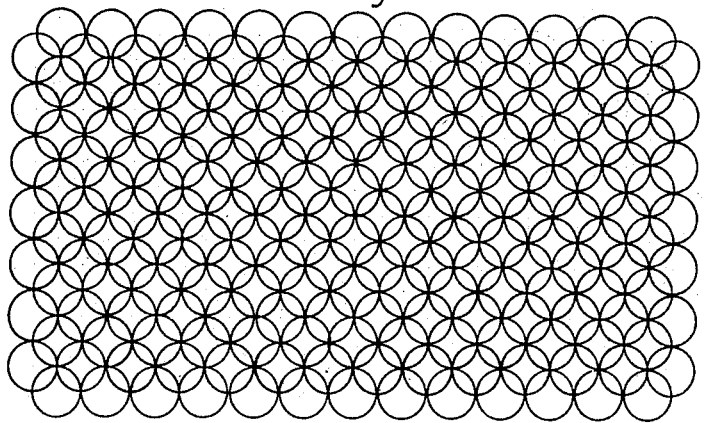
Inventors
J. B. Morelli
C. B. Morelli
Their Atty.

UNITED STATES PATENT OFFICE.

JUAN BUTAZZI MORELLI AND CARO BUTAZZI MORELLI, OF BARCELONA, SPAIN.

ARMORED PNEUMATIC TIRE.

1,400,450. Specification of Letters Patent. Patented Dec. 13, 1921.

Application filed August 28, 1919. Serial No. 320,486.

*To all whom it may concern:*

Be it known that we, JUAN BUTAZZI MORELLI and CARO BUTAZZI MORELLI, residing at Barcelona, in the county of Barcelona, Spain, have invented certain new and useful Improvements in Armored Pneumatic Tires, and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a pneumatic tire made up of different parts so associated as to provide what is commonly known as an armored tire.

The improved tire is built up of a number of fabric layers with an armor strip interposed therebetween and a tread strip overlying the fabric strips with the whole connected by riveting members having head portions projected through and in the wear surface of the tread section to act as wear elements as well as binding members for the tire layers.

In the drawings:—

Figure 1 is a sectional view of the improved tire.

Fig. 2 is an enlarged plan of the armor layer.

Fig. 3 is an elevation of one of the binding rivets.

Fig. 4 is a detail sectional view of the tire showing the rivets in place.

The improved tire is built up of several layers of canvas or like fabric A, arranged in superimposed relation as is usual in tire structures, and secured to each other by intervening cementitious material, or if preferred the layers may be secured together by the adhesion resulting from the proper impregnation of such layers with rubber solution. To this fabric or body section there is applied a second section made up of two canvas strips, C. D, there being preferably placed a rubber filling strip B between the body layers A and the section layers C and D. The armor strip E is arranged between the canvas strips C and D, such armor strip being substantially of the full area of the canvas strips C and D and being preferably of open work material as shown in Fig. 2. For example, the armor strip may consist of interconnected ring sections presenting thus the requisite strength and armor qualities with the substantial flexibility desired in a tire structure. The openings of the particular armor section are preferably filled with a rubber solution, so that the fabric strips C and D between which the armor section is placed are through the rubber filling described, practically cementing one to the other by means which extend through openings in the armor section for this purpose. The net work armor section arranged as the preferred form of such is preferably secured at its edges by hemp thread as indicated at F, Fig. 1, and it is preferred that the material of the armor section be such that it will not readily corrode.

The final section of the tire consists of a wear or tread strip G, which may be of canvas or other suitable material, and which is preferably provided with a lining of rubber to secure additional strength. Rivets are passed through the sections making up the tire, the said rivets having washers H and I, arranged thereon, in order that through the setting of the rivets an intimate and close association of all the tire layers may be readily had. The heads of the rivets project through and preferably slightly beyond the cover and tread section of the tire to take a larger portion of the wear incident to use. If desired, the rivets need not extend through the entire sections making up the tire casing, in which event they will pass merely through the tread layer.

We claim:—

A tire casing made up of fabric sections cemented together, an armor section secured to the fabric section and comprising two fabric strips with a metallic armor section secured between them, cementitious material securing said strips of the armor section to each other and to the armor, and a tread section made up of a fabric strip having a rubber lining, and rivets passing through the strips and having their heads arranged beyond the outer surface of the tread section.

In testimony whereof we have signed our names to this specification in the presence of two subscribing witnesses.

JUAN BUTAZZI MORELLI.
CARO BUTAZZI MORELLI.

Witnesses:
FERNANDO PERANI,
JOAQUIN DE DALMAIES.